United States Patent [19]
Watkins

[11] Patent Number: 5,366,635
[45] Date of Patent: Nov. 22, 1994

[54] DESALINIZATION SYSTEM AND PROCESS

[75] Inventor: Larry O. Watkins, Sacramento, Calif.

[73] Assignee: Global Water Technologies, Inc., Sacramento, Calif.

[21] Appl. No.: 185,676

[22] Filed: Jan. 24, 1994

Related U.S. Application Data

[63] Continuation of Ser. No. 982,593, Nov. 27, 1992, abandoned.

[51] Int. Cl.$^5$ ............................................. B01D 61/00
[52] U.S. Cl. ................................. 210/651; 210/650; 210/195.2; 210/257.2; 210/170; 210/321.72; 210/321.74
[58] Field of Search ...................... 210/652, 195.2, 651, 210/257.2, 170, 321.72, 257.1, 195.1, 258, 650

[56] References Cited

U.S. PATENT DOCUMENTS

| | | |
|---|---|---|
| 3,060,119 | 10/1962 | Carpenter . |
| 3,171,808 | 3/1965 | Todd . |
| 3,456,802 | 7/1969 | Cole . |
| 4,046,685 | 9/1977 | Bray . |
| 4,070,280 | 1/1978 | Bray ..................................... 210/652 |
| 4,125,463 | 11/1978 | Chenoweth ......................... 210/170 |
| 4,156,645 | 5/1979 | Bray . |
| 4,169,789 | 10/1979 | Lerat ................... 210/257.2 |
| 4,335,576 | 6/1982 | Hopfe . |
| 4,452,696 | 6/1984 | Lopez . |
| 4,512,886 | 4/1985 | Hicks et al. .......................... 210/170 |
| 4,770,775 | 9/1988 | Lopez ............................ 210/321.83 |
| 4,772,385 | 9/1988 | Yamada et al. ........................ 210/87 |
| 4,789,468 | 12/1988 | Sirkar ................................. 210/137 |
| 5,098,575 | 3/1992 | Yaeli .................................. 210/652 |
| 5,167,786 | 12/1992 | Eberle ................................. 204/229 |
| 5,186,822 | 2/1993 | Tzong et al. ......................... 210/122 |
| 5,229,005 | 7/1993 | Fok et al. ............................. 210/652 |

FOREIGN PATENT DOCUMENTS

| | | |
|---|---|---|
| 1414138 | 7/1967 | United Kingdom . |
| 2068774 | 8/1981 | United Kingdom . |

Primary Examiner—Robert A. Dawson
Assistant Examiner—Ana M. Fortuna
Attorney, Agent, or Firm—Thomas R. Lampe

[57] ABSTRACT

Desalinization apparatus and method for removing salt from sea water in which the separator is positioned at a location a substantial distance below the surface of a body of sea water. The head pressure of the body of sea water is utilized to force sea water through the separator means to separate the salt from the sea water.

7 Claims, 2 Drawing Sheets

DESALINIZATION SYSTEM AND PROCESS

This is a continuation, of application Ser. No. 07/982,593 filed Nov. 27, 1992, now abandoned.

TECHNICAL FIELD

This invention relates to a desalinization system, and more particularly, to a method and apparatus for removing salt from sea water.

BACKGROUND ART

A variety of systems exist for removing salt from sea water so that the water can be utilized for drinking, cultivation, and other useful purposes.

In a typical prior art desalinization plant, sea water is pumped from the ocean or other body of sea water or from a well adjacent thereto, and then conveyed to separator equipment positioned on land. Conventionally some or all of the facility is behind walls and under roof. The pumped sea water is then filtered and applied under extremely high pressure to one or more assemblies including membranes utilized to separate salt from the sea water. This high pressure is provided by a high pressure pump conventionally operating in a range of from about 45 Kg/cm$^2$ to about 70 Kg/cm$^2$, most typically at about 56 Kg/cm$^2$. After passing through the membrane assembly or assemblies housed in a high pressure vessel that portion of the sea water which has been desalinized (hereinafter occasionally referred to as fresh water) is pumped or otherwise conveyed to a desired storage area.

The fresh water normally only accounts for about 30 per cent of the sea water actually pumped through the system. The other 70 per cent, the brine component, must again be pumped to convey it out to sea. In other words a considerable volume of water in excess of the amount of the fresh water produced must be pumped through the system utilizing current equipment and procedures.

DISCLOSURE OF INVENTION

The present invention relates to both a method and apparatus for efficiently, and effectively desalinizing sea water.

The desalinization method of the present invention for removing salt from sea water includes the step of positioning separator means for separating salt from sea water at a first predetermined location a substantial distance below the surface of a body of sea water, the separator means having an inlet and an outlet.

Communication is established between the separator means inlet and the body of sea water while the separator means is at the first predetermined location to pressurize the separator means with the head pressure of the body of sea water and force sea water therethrough so that it exits from the separator means outlet.

Salt is removed from the sea water forced through the separator means by the head pressure of the body of sea water whereby the sea water at the separator means outlet is less saline than the sea water at the separator means inlet. The fresh water is then transported from the outlet to a predetermined discharge location.

The method of the present invention includes the step of maintaining a pressure at the separator means outlet which is less than the head pressure of the body of sea water at the first predetermined location.

In an additional step, a quantity of sea water is accumulated in a chamber under the surface after the sea water exits from the separator means outlet and before transport thereof to the predetermined discharge location.

The first predetermined location is at least about 461 meters below the surface of the body of sea water and the predetermined discharge location is on land, the transporting step comprising pumping sea water from the first predetermined location to the predetermined discharge location through a conduit.

The system apparatus includes separator means for separating salt from sea water at a first predetermined location a substantial distance below the surface of a body of water, the separator means having an inlet and an outlet. The separator means inlet is for communication with the body of water while the separator means is at the first predetermined location to pressurize the separator means with the head pressure of the body of sea water and force sea water therethrough prior to exit of the sea water from the separator means outlet.

The separator means is operable to remove salt from the sea water forced through the separator means by the head pressure of the body of sea water whereby the sea water at the separator means outlet is less saline than the sea water at the separator means inlet. Means are provided for transporting sea water from the outlet to a second, predetermined discharge location.

Other features, advantages, and objects of the present invention will become apparent with reference to the following description and accompanying drawings.

BEST MODE FOR CARRYING OUT THE INVENTION

Figure 1:
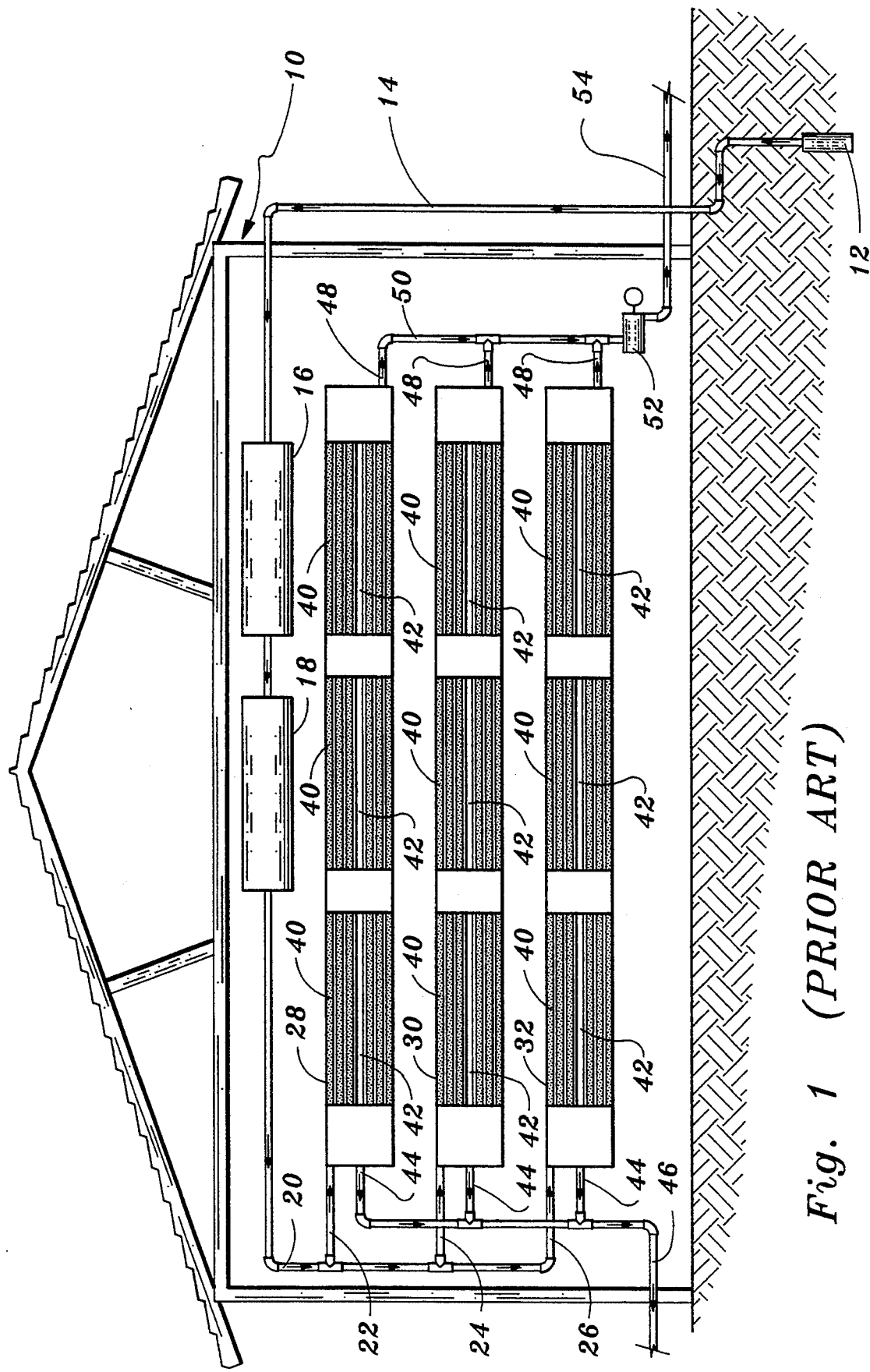
FIG. 1 is a somewhat diagrammatic presentation illustrating components of a typical prior art desalinization plant disposed on land.

FIG. 1 illustrates principal components and layout of a typical prior art water desalinization plant. The plant includes a building 10 which is positioned on land, conventionally immediately adjacent to a body of sea water (not shown). In this particular instance, the sea water is not drawn directly from the body of sea water but rather from a well adjacent thereto. Of course, it is also well known to pump sea water directly from the body of sea water itself to supply a plant on the shore.

In the illustrated arrangement, a pump 12 disposed in a well pumps the sea water through a pipe 14 leading to a salt water filter 16. Filter 16 is employed to remove any existing contaminates and particles from the sea water.

The filtered sea water then proceeds to a high pressure pump 18 as shown by the illustrated fluid flow arrow. Pump 18 typically operates to pressurize the water in a range of from about 45 Kg/cm$^2$ to about 70 Kg/cm$^2$, normally about 56 Kg/cm$^2$, and it will be appreciated that considerable energy is expended in connection with the operation of the pump. Furthermore, the other components of the system downstream from the high pressure pump 18, such as pipes and fittings, must be capable of handling such high pressures and corrosion of salt water.

From high pressure pump 18, the pressurized sea water flows as indicated by the arrows in FIG. 1 through a pipe 20 which branches off into three connector pipes 22, 24, 26.

Each of the connector pipes 22, 24, 26 is connected to a pressure vessel or housing, the pressure vessels being designated by reference numerals 28, 30, 32. Such pressure vessels, in the disclosed embodiment, are of identical construction and are employed to remove salt from the sea water entering same.

Salt separation is accomplished by flowing the pressurized water along membranes of membrane members 40 which may, for example, be Osmo Sepralators made available by Osmonics, Inc. of Minnetonka, Minn., U.S.A. Such sepralators incorporate membranes disposed in a spiral configuration in a pressure vessel or housing. The fresh or desalinated water produced will be deposited in a central conduit 42 of the sepralator after passing through the membranes.

The central conduits 42 of the membrane members 40 in each pressure vessel are interconnected and exit from an exit pipe 44 to a pipe 46 conveying the treated water to a storage site (not shown).

The brine or salty segment of the sea water flows into exit pipes 48 and thence into a pipe 50. A turbine 52 extracts some of the energy from the pressurized water before allowing its return to the sea through pipe 54.

With the prior art approach described above, it is quite typical that only about 30 per cent of the salt water treated will be converted to fresh water and the remaining approximately 70 per cent will have to be reconveyed back to the source of the salt water. In other words, a considerable volume of water in excess of the volume of fresh water actually produced must be pumped and conveyed through the system.

Figure 2:
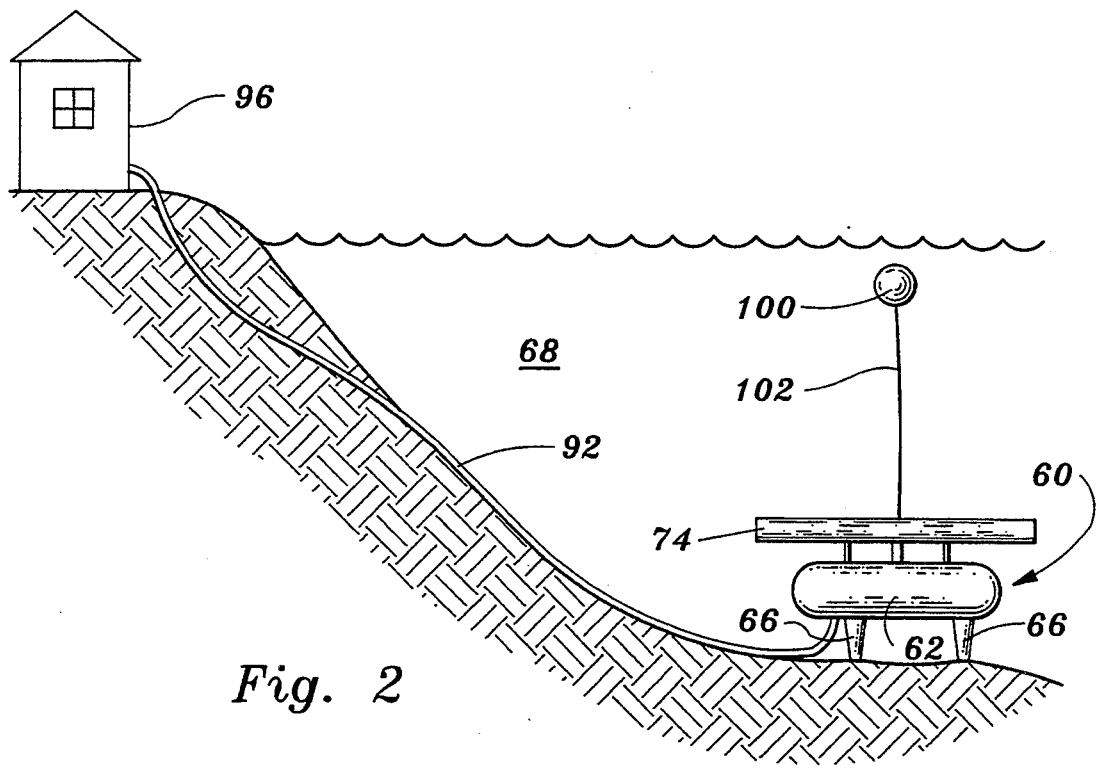
FIG. 2 is an illustration of apparatus encompassing the teachings of the present invention.
Figure 3:
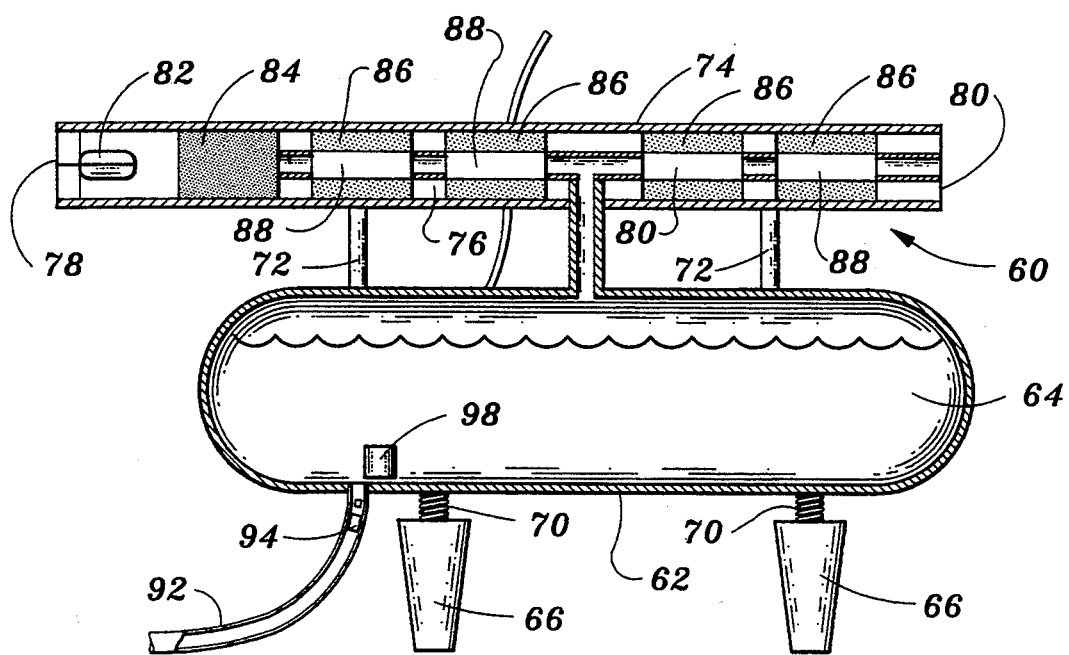
FIG. 3 is a somewhat diagrammatic presentation of selected components of the apparatus.

FIGS. 2 and 3 of the drawings illustrate the present invention. In the approach of the present invention, such treatment occurs offshore in the body of sea water itself and the pressure of the sea water is utilized to carry out important functions which would otherwise be accomplished only through utilization of high pressure pumping means.

The apparatus 60 of the invention includes a tank 62 defining a chamber 64. The chamber 64 is supported by legs 66 on the bottom of a body of sea water 68. If desired, the legs may incorporate a self-leveling mechanism to maintain the tank 62 level. In FIG. 3, for example, each leg 66 is connected to the tank 62 by a motor powered jack screw mechanism 70 which is controlled by a suitable control mechanism (not shown). All electrical components of the present invention, including the motor of the jack screw mechanism, may be energized by a cable (not shown) connected to a power source on shore. It is also conceivable that other sources of electricity may be employed such as a power generation barge floating on shore above the tank and connected thereto by an electric cable.

Two support members 72 project upwardly from tank 62 and support separator means including a housing 74. Housing 74, in the arrangement shown, is in the form of an open ended tube or conduit defining a fluid flow path 76 having an entry end 78 and an exit end 80, both communicating with the body of sea water. A motor-powered pump 82 is at the entry end and, when energized, pump 82 directs a flow of water from the entry end 78 to the exit end 80.

The water flowing within housing 74 first passes through a filter 84 which removes any relatively large particulates from the sea water passing therethrough. After exiting the filter 84, the filtered sea water passes seriatim through membrane members 86 which, for example, may be the above referenced Osmo Sepralators made available by Osmonics, Inc., and along the surfaces of the membranes therein. However the principals of the present invention are applicable to any suitable form of desalinization separator relying upon fluid pressure for its operation.

All of the membrane members 86 incorporate a central conduit 88 about which the membranes are spirally wound. The central conduits are interconnected and deliver fresh water processed through the membranes of membrane members 86 to an outlet pipe 90 communicating with chamber 64 of tank 62. The brine segment of the sea water passing through housing 74 is discharged back into the body of sea water through exit end 80.

With the arrangement just described, the head pressure of the body of sea water is utilized to force sea water through the membranes of the separator means to perform the desalinization function. It has been found that the apparatus should be deployed at least about 461 meters below the surface of a body of sea water to function efficiently, given the present state of the desalinization membrane art. The head pressure of the body of sea water at the location of placement is within a range of from about 45 $Kg/cm^2$ to about 70 $Kg/cm^2$. Of course any reduction of pressures required to utilize any given membrane or other desalinization separator device could be reflected in deployment of the apparatus at a lesser distance from the surface of the body of sea water.

Some pressure differential must exist between the separator means inlet in communication with the body of sea water and the pressure at the separator means outlet 90 for the apparatus to operate. That is, the pressure at the separator means outlet must be maintained at a lesser level than the head pressure of the body of sea water at the location of placement of the desalinization apparatus. In the arrangement shown, a conduit 92 is in communication with the tank chamber 64 at the bottom of the tank. A pump 94 pumps the fresh water from the chamber through the conduit 92 to an on shore facility 96. Operation of the pump 94 creates a partial vacuum within the tank chamber at the outlet pipe 90 to facilitate operation of the apparatus.

If desired, a water level monitor 98 may be employed in the tank chamber and utilized in operational relationship with the pump 94 to shut off the pump when the water level approaches the bottom of the tank chamber. To clearly mark the location of the apparatus 60 a buoy 100 may be attached to a line 102.

It will be seen that much of the "work" of the apparatus and method of the present invention during the desalinization process is accomplished by utilizing the head pressure of a body of sea water to replace high pressure pump means. The only significant energy expenditure is through use of the pump 94 conveying treated or fresh water to the desired location. As previously indicated, this is currently typically about 30 per cent of the water passing through the treatment system. In the present invention, it is preferred that the extracted fresh water comprise no more than 25 per cent of the water passing through the system in order to prevent excess salt build-up on the input side of the separator means.

I claim:

1. A desalinization method for removing salt from sea water, said desalinization method comprising, in combination, the steps of:

positioning a filter and separator means for filtering sea water and separating salt from the filtered sea water at a first predetermined location at a substantial distance below the surface of a body of sea water, said filter and separator means including a housing defining a fluid flow path, an inlet to said fluid flow path, an exit from said fluid flow path, and a desalinated sea water outlet located between said inlet and said exit, said inlet, said exit and said desalinated sea water outlet being in communication with said fluid flow path, said separator means further including at least one membrane separating salt from the sea water;

flowing sea water filtered by the filter in a controlled flow through said housing along said fluid flow path between the inlet and exit, said controlled flow maintained at the head pressure of said body of sea water at said first predetermined location;

establishing communication between the inlet, the exit, the desalinated sea water outlet and said body of sea water while said separator means is at said first predetermined location and pressurizing said fluid flow path with the head pressure of said body of sea water to force sea water through said at least one membrane and through said desalinated sea water outlet;

removing salt from the sea water forced through said at least one membrane and through said desalinated sea water outlet to produce at least partially desalinated sea water at said desalinated sea water outlet;

maintaining a pressure at said desalinated sea water outlet which is less than the head pressure of said body of sea water at said first predetermined location to promote flow of sea water through said desalinated sea water outlet and said at least one membrane; and transporting the at least partially desalinated sea water from said desalinated sea water outlet to a predetermined discharge location by pumping the at least partially desalinated sea water from said first location to said predetermined discharge location.

2. The method according to claim 1 including the additional step of accumulating a quantity of at least partially desalinated sea water in a chamber under the surface after the at least partially desalinated sea water exits from said desalinated sea water outlet and before transport thereof to said second predetermined location, said transporting step including pumping said at least partially desalinated sea water from said chamber to said discharge location, while applying vacuum at the desalinated sea water outlet.

3. The method according to claim 1 wherein said first predetermined location is at least about 461 meters below the surface of a body of sea water.

4. The method according to claim 1 wherein said separator means includes a plurality of membranes for separating salt from the sea water, said flowing step comprising flowing sea water seriatim along a surface of each of said plurality of membranes during the step of removing the salt from the sea water.

5. The method according to claim 4 wherein sea water is forced through each of said membranes to remove salt from the sea water, said method including the step of accumulating the at least partially desalinated sea water forced through each of the membranes.

6. Apparatus for removing salt from sea water in a body of sea water having a surface and for producing at least partially desalinated sea water comprising, in combination:

a filter connected to separator means for filtering sea water and separating salt from the filtered sea water at a first predetermined location at a substantial distance below the surface of said body of sea water, said filter and separator means including a housing defining a fluid flow path, an inlet to said fluid flow path, an exit from said fluid flow path and a desalinated sea water outlet located between said inlet and said exit, said inlet, said exit and said desalinated sea water outlet being in communication with said fluid flow path, said separator means further including at least one membrane for separating salt from the sea water, said inlet and said exit in communication with said body of water while said filter and said separator means are in said first predetermined location at a substantial distance below the surface of said body of water to pressurize said fluid flow path with the head pressure of said body of sea water and employ the head pressure of said body of sea water to force sea water through at least one membrane and through said desalinated sea water outlet, said separator means operable to remove salt from the sea water forced through said at least one membrane and through the desalinated sea water outlet to produce an least partially desalinated sea water at said desalinated sea water outlet, means for promoting a controlled flow of sea waters through said housing along said fluid flow path between said inlet and said exit, and maintaining the flow of sea water at least at the head pressure of said body of sea water at said first predetermined location, means for maintaining a pressure at said desalinated sea water outlet which is less than the head pressure of said body of sea water at said first predetermined location to promote flow of sea water through said outlet and said at least one membrane, and for transporting the at least partially desalinated sea water from said desalinated sea water outlet to a predetermined discharge location, including conduit means extending between the first predetermined location and the predetermined discharge location and pump means for pumping the at least partially desalinated sea water from the first predetermined location to said predetermined discharge location through said conduit means.

7. The apparatus according to claim 6 additionally comprising means defining a chamber for receiving a quantity of the at least partially desalinated sea water connected to said desalinated sea water outlet and to said pump means for pumping said at least partially desalinated sea water from said chamber and applying a vacuum at the desalinated sea water outlet.

\* \* \* \* \*